Oct. 21, 1969

JAMES E. WEBB
ADMINISTRATOR OF THE NATIONAL AERONAUTICS
AND SPACE ADMINISTRATION
DEVICE FOR PREVENTING HIGH VOLTAGE ARCING IN
ELECTRON BEAM WELDING 3,474,220

Filed May 17, 1967

KARL K. HANCHEY,
JAMES C. MAHAN,
JAMES S. KUBIK,
INVENTORS

ATTORNEYS

Oct. 21, 1969   JAMES E. WEBB   3,474,220
ADMINISTRATOR OF THE NATIONAL AERONAUTICS
AND SPACE ADMINISTRATION
DEVICE FOR PREVENTING HIGH VOLTAGE ARCING IN
ELECTRON BEAM WELDING
Filed May 17, 1967   2 Sheets-Sheet 2

KARL K. HANCHEY,
JAMES C. MAHAN,
JAMES S. KUBIK,
INVENTORS

BY
ATTORNEYS

United States Patent Office 3,474,220
Patented Oct. 21, 1969

3,474,220
DEVICE FOR PREVENTING HIGH VOLTAGE ARCING IN ELECTRON BEAM WELDING
James E. Webb, Administrator of the National Aeronautics and Space Administration, with respect to an invention of Karl K. Hanchey, Utica, Mich., James C. Mahan, Athens, Ala., and James S. Kubik, Utica, Mich.
Filed May 17, 1967, Ser. No. 640,447
Int. Cl. B23k 9/00
U.S. Cl. 219—121       2 Claims

ABSTRACT OF THE DISCLOSURE

A device for preventing high voltage arcing in electron beam welding wherein an arc suppressor plate is mounted on an electron gun from which the electron welding beam emits, the welding operation being performed within an evacuated chamber. A metallic tube has the suppressor plate attached to one end thereof and the other end of the tube is attached to the electron gun. The electron welding beam passes from the electron gun, through the metallic tube and through an opening in the suppressor plate before striking the work. The suppressor plate is positioned very close to the work and attracts and collects arc producing plasma rising from the work during welding.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates generally to electron beam welding and particularly to a device for eliminating one of the major problems connected with electron beam welding, that of high voltage arcing.

While electron beam welding is well known and commonly practiced in the welding field, its potentialities for certain applications are just beginning to be realized, and it is the object of much study, experimentation, and development.

Electron beam welding is conducted within an evacuated region, such as a vacuum chamber, and basically involves the acceleration of a stream of electrons from an electron gun to a workpiece. This manner of welding offers several very important advantages including a high purity, which is essential to welding reactive metals, and produces very high heat concentration at the area to be welded, permitting sound weldment of a high depth to width ratio. These and other attributes of electron beam welding causes this type of welding to be of particular interest and use in the aerospace field in the construction of missiles, rockets, and aircraft.

Heretofore, one of the most serious problems associated with electron beam welding has been the occurrence of intermittent disturbances of the electron beam due to high voltage discharges, commonly referred to as arcing. Although the problem of arcing has been encountered by most practitioners of electron beam welding, its exact cause or causes are not completely understood. It is generally believed, however, that the escaping gases and metallic vapor emitted from the workpiece during welding form what might be called a conductive cloud that intermittently provides a conductive path from the high voltage components of the welding apparatus to ground. The combination of gases, electrons, and ions emitted from the area of beam impingment is commonly referred to as plasma and the emission of this plasma from the workpiece during welding is referred to as "secondary emission." It has been noted that the arcing problem is particularly severe when welding thick aluminum alloys that generate relatively large amounts of metallic vapor and gases during welding.

The effect of high voltage arcing on the quality of the weld depends on the severity and duration of the arcing. A "spike" defect usually appears in the weld at the point where arcing occurs, and if the arcing is of sufficient duration to cause the high voltage circuit to open, the electron beam is extinguished leaving a hole completely through the weldment.

Accordingly, it is an object of this invention to provide a means for suppressing secondary emission and thus preventing high voltage arcing in electron beam welding.

Another object is to provide in electron beam welding a device for preventing weld defects caused by high voltage arcing.

A further object is to provide a device for electron beam welding of reactive metals while preventing weld defects caused by high voltage arcing.

Other objects, uses, and advantages of the present invention will become apparent as the description proceeds.

Although, as indicated previously, the precise cause or causes of arcing in electron beam welding are not thoroughly understood, a means of eliminating this problem has been found in accordance with the present invention. Briefly described, the invention comprises an electron beam welding device including a vacuum chamber equipped with an electron gun that carries a metallic arc suppressor element positioned between the electron gun and the work to be welded. Typically, the suppressor element comprises a metallic plate having an opening therethrough to permit passage of an electron beam passing from the electron gun to the work, the suppressor plate being very close to the point where the electron beam strikes the work. The electrons which are emitted secondarily from the work are attracted by the metallic suppressor plate thus preventing the formation of the arc producing conductive cloud within the vacuum chamber.

In describing the invention in detail, reference will be made to the accompanying drawing in which.

Figure 1:
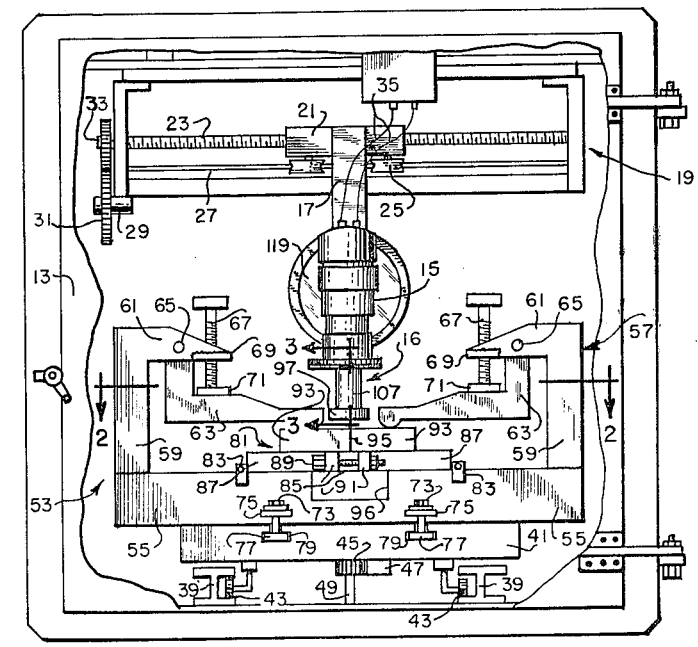
FIGURE 1 is a front elevational view, partially broken away, of a vacuum chamber of an electron beam welding apparatus.
Figure 2:
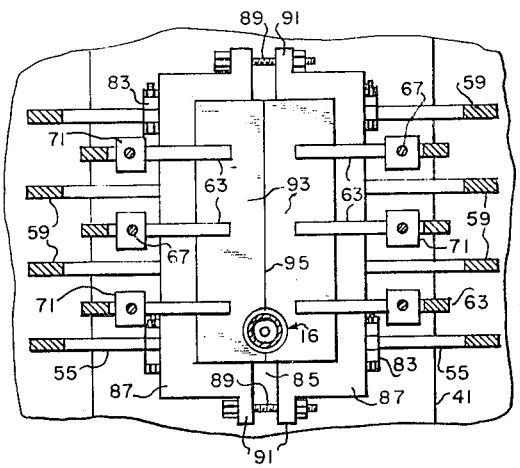
FIGURE 2 is a fragmentary cross sectional view taken along line 2—2 of FIGURE 1.

Referring now to FIGURE 1, there is shown a vacuum chamber 11 of an electron beam welding apparatus with an access door 13 cut away to reveal the interior of the vacuum chamber. The chamber 11 contains an electron gun 15 movably suspended approximately along the vertical axis of the chamber by a bracket 17 on a track system 19 installed in the upper region of the vacuum chamber 11. Attached to the electron gun 15 is a secondary emission suppressor 16, the details and purpose of which will be provided hereinafter. The bracket 17 is connected to a travel block 21 through which a screw 23 is threaded and which carriers rollers 25 that roll on a track 27 upon rotation of the screw 23. The screw 23 is actuated by a motor 29 through a gear train including gears 31 and 33. Wires 35 lead from the electron gun 15 to an appropriate high voltage power source (not shown). The details of the electron gun and track system 19 form no part of the present invention and will not be described in further detail.

Mounted on the bottom of the chamber 11 are spaced parallel tracks 39 that support a carriage bed 41 through rollers 43. Movement of the carriage bed over the tracks 39 is effected by a cog wheel 45 meshed with a rack 47 connected to and extending the length of the carriage bed 41. A shaft 49 is joined to the cog wheel and is rotated by a motor (not shown) mounted beneath the vacuum chamber 11.

Bearing on the carriage bed 41 is a frame unit 53 including a series of spaced parallel cross beams or bars 55. At each end of each cross beam 55 is connected, as by welding, a bracket 57 that has a vertical portion 59 and an inwardly directed horizontal portion 61. Clamps 63 are located between the brackets 57, being pivotally connected to pins 65 extending between and through the brackets 57. Clamping pressure of the clamps 63 is exerted by screws 67 supported by and threaded through bars 69 extending between the brackets 57. The ends of the screws 67 bear on plates 71 welded to the respective clamps 63.

The frame unit 53, comprising the cross beams 55, brackets 57 and clamps 63, is secured to the carriage bed 41 by clamp bolts 73 mounted in plates 75 welded to the respective cross beams 55. The bolts 73 threadedly engage movable nuts 77 that slide within slots 79 in the carriage bed 41.

A workpiece support 81 rests on the cross beams 55, being retained in position by stops 83 removably clamped to the beams 55 and abutting the opposite edges of the workpiece support 81. In order to provide for a slot 85 in the workpiece support to coincide with the joint to be welded, the workpiece support comprises two separable plates 87 that are adjustably spaced apart by bolts 89 threaded in opposed projections 91 at the ends of the plates 87.

The work to be welded is arranged on the workpiece support 81 and comprises metallic components 93 set up for a square butt joint weld along a meeting line 95, with clamps 63 holding the components 93 in position.

Figure 3:
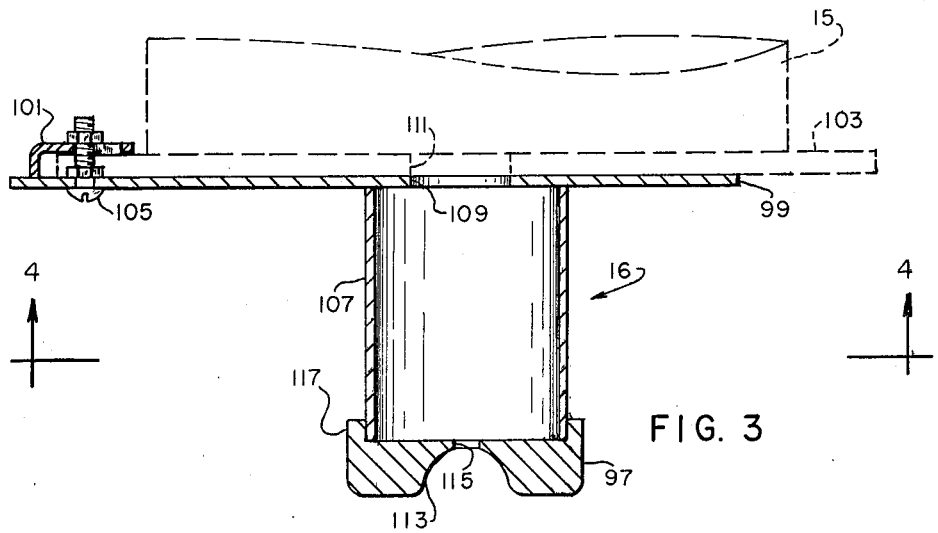
FIGURE 3 is an enlarged cross sectional view taken along line 3—3 of FIGURE 1.
Figure 4:
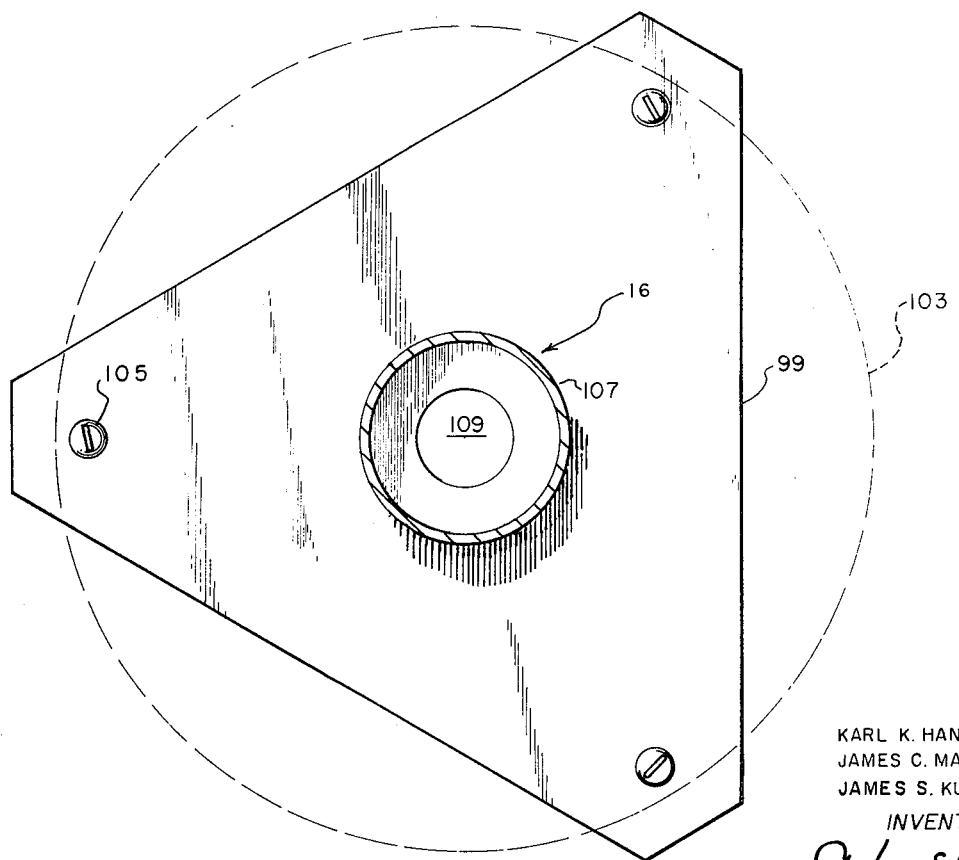
FIGURE 4 is a cross sectional view taken along line 4—4 of FIGURE 3.

As shown in FIGURES 3 and 4, the secondary emission suppressor 16 comprises a suppressor element in the form of a circular plate 97 attached to the electron gun 15 by a triangular mounting plate 99 having a slotted clamp 101 at each corner thereof so that each clamp engages a disk 103 which constitutes the lower element of the electron gun 15, the clamps 101 being actuated by screws 105. Welded to and extending between mounting plates 99 and the suppressor plate 97 is a metallic tube 107, the latter being aligned with a hole 109 in the mounting plate 99 and a hole 111 in the disk 103.

The suppressor plate 97 is a relatively thick metallic element with a concave recess 113 around a hole 115 in the center of the plate. The hole 115 is aligned with the holes 109 and 111 in the mounting plate 99 and disk 103, respectively, and thus is aligned with the electron welding beam produced by the electron gun 15. The suppressor plate 97 has a slight integral sleeve 117 that fits over the tube 107.

In the electron beam welding operation, the work, such as metalic components 93, are arranged as described above within the vacuum chamber 11 and the electron gun 15 is focused on the meeting line 95. After the vacuum chamber is closed and evacuated, an electron beam produced by the electron gun 15 is passed from the gun through the tube 107 and the hole 115 in the suppressor plate 97 and then strikes and penetrates the work at the meeting line 95, the high heat concentration resulting in a melting and fusion of the abutting edges of the components 93. Directly below the meeting line 95 aligned recesses 96 are formed in the cross beams 55. The work is removed by the carriage bed at a predetermined and constant rate beneath the electron gun 15 until the full length of the joint to be welded has intersected the electron beam. The near surface of the suppressor plate 97 is spaced from the work by a small amount, preferably between ¼ and ¾ inch. The welding operation is observed through windows 119 located in the walls and door of the vacuum chamber 11.

With this arrangement it has been found that during welding the secondary emission suppressor is quite effective in preventing high voltage arcing between the high voltage components and any portion of the gun or vacuum chamber that it at ground potential. The suppressor plate 97 is maintained at ground potential and attracts and collects the secondary emission, thus preventing the formation of arc producing conductive clouds within the vacuum chamber.

Obviously, numerous modifications and variations of the present invention are possible in the light of the above teachings. The secondary emission suppressor is susceptible of various configurations and structures. For example, the suppressor element could take the form of an integral annular flange on the end of the tube 107. Thus it is to be understood that within the scope of the appended claims the invention may be practiced otherwise than specifically described herein.

What is claimed is:
1. In an electron beam welding apparatus comprising a vacuum chamber enclosing an electron gun and adapted to enclose a work to be welded, and having means including said electron gun for producing an electron welding beam within said vacuum chamber and impinging said beam on a work to be welded within said vacuum chamber:
   (a) the exit end of said electron gun having an opening therein which is adapted to pass an electron beam;
   (b) a secondary emission suppressor carried by said electron gun;
   (c) said suppressor comprising a metallic tube having one end attached to and contiguous with said exit end of said gun;
   (d) the opening through said tube being in alignment with said opening in said exit end of said gun;
   (e) a metallic suppressor plate joined to and covering the end of said tube opposite said exit end of said gun;
   (f) said plate having an aperture therethrough in alignment with said opening in said exit end of said gun whereby said opening through said tube and said aperture in said plate are aligned with the path of the electron beam produced by said gun;
   (g) means within said vacuum chamber for moving a workpiece relative to said gun;
   (h) said gun being movably mounted for positioning within said chamber;
   (i) said metallic tube extending from said gun a distance sufficient to position the nearest surface of said suppressor plate to within ¾ inches of a workpiece mounted in said chamber.

2. The invention as defined in claim 1 wherein said tube is attached to said exit end of said gun by a connecting plate detachably clamped to said gun, said connecting plate having an aperture therethrough aligned with said aperture in said suppressor plate, said tube completely enclosing the path of said welding beam between said connecting plate and said suppressor plate.

References Cited

UNITED STATES PATENTS

| | | | |
|---|---|---|---|
| 2,899,556 | 8/1959 | Schopper et al. | 219—121 |
| 3,132,198 | 5/1964 | Du Bois et al. | 219—121 |
| 3,174,026 | 3/1965 | Bowers et al. | 219—121 |
| 3,291,959 | 12/1966 | Schleich et al. | 219—121 |
| 3,315,157 | 4/1967 | Watanabe et al. | 219—121 |
| 3,327,090 | 6/1967 | Greene | 219—121 |
| 2,793,281 | 5/1957 | Steigerwald | 219—121 |
| 3,187,216 | 6/1965 | Sciaky | 219—121 |
| 3,219,792 | 11/1965 | Pederson | 219—121 |
| 3,322,930 | 5/1967 | Sciaky | 219—121 |
| 3,351,731 | 11/1967 | Tanaka | 219—121 |
| 3,406,273 | 10/1968 | Holland | 219—121 |

JOSEPH V. TRUHE, Primary Examiner

W. DEXTER BROOKS, Assistant Examiner